United States Patent
Sugino et al.

(10) Patent No.: US 11,624,460 B2
(45) Date of Patent: Apr. 11, 2023

(54) THREADED CONNECTION FOR STEEL PIPE

(71) Applicants: NIPPON STEEL CORPORATION, Tokyo (JP); VALLOUREC OIL AND GAS FRANCE, Aulnoye-Aymeries (FR)

(72) Inventors: Masaaki Sugino, Tokyo (JP); Yousuke Oku, Tokyo (JP); Keita Inose, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 112 days.

(21) Appl. No.: 17/273,948

(22) PCT Filed: Aug. 6, 2019

(86) PCT No.: PCT/JP2019/030799
§ 371 (c)(1),
(2) Date: Mar. 5, 2021

(87) PCT Pub. No.: WO2020/070968
PCT Pub. Date: Apr. 9, 2020

(65) Prior Publication Data
US 2021/0332917 A1 Oct. 28, 2021

(30) Foreign Application Priority Data
Oct. 2, 2018 (JP) .............................. JP2018-187146

(51) Int. Cl.
F16L 15/04 (2006.01)
F16L 15/06 (2006.01)
F16L 15/00 (2006.01)

(52) U.S. Cl.
CPC ............. *F16L 15/06* (2013.01); *F16L 15/002* (2013.01); *F16L 15/04* (2013.01)

(58) Field of Classification Search
CPC ....... F16L 15/04; F16L 15/001; F16L 15/006; F16L 15/06; E21B 17/042
See application file for complete search history.

(56) References Cited

U.S. PATENT DOCUMENTS

| | | | |
|---|---|---|---|
| 4,692,988 A * | 9/1987 | Shulver | F16L 15/004 285/94 |
| 5,137,310 A | 8/1992 | Noel et al. | |

(Continued)

FOREIGN PATENT DOCUMENTS

| | | |
|---|---|---|
| JP | 1993087275 A | 4/1993 |
| JP | 2012247028 A | 12/2012 |
| WO | 2019082612 A1 | 5/2019 |

*Primary Examiner* — David Bochna
(74) *Attorney, Agent, or Firm* — Greer Burns & Crain Ltd.

(57) ABSTRACT

A threaded connection with good internal-pressure and external-pressure sealability while preventing galling is provided. A threaded connection 1 includes a pin 10 and a box 20. The pin 10 includes a pin lip 11, a pin metal seal 13, and a cylindrical inner machined surface 14. The pin metal seal 13 includes a pin seal taper surface 16 and a pin seal curvature surface 17. The box 20 includes a box metal seal 22 parallel to the pin seal taper surface 16. The pin metal seal 13 sealingly contacts the box metal seal 22 at a seal point SP. The threaded connection satisfies the following expressions, (1) and (2), $$L > Lm > Ls \quad (1), \text{ and}$$

$$tb/tp > 1.6 \quad (2).$$

L is the length of the pin lip 11; Lm is the distance between the tip AP of the pin and the end point of the cylindrical inner machined surface 14; Ls is the distance between the tip AP (Continued)

of the pin 10 and the seal point SP; tb is the wall thickness of the box 20 as measured at the seal point SP when the connection is made up; and tp is the wall thickness of the pin 10 as measured at the seal point SP.

14 Claims, 8 Drawing Sheets

(56) References Cited

U.S. PATENT DOCUMENTS

| | | | |
|---|---|---|---|
| 2015/0191980 A1* | 7/2015 | Rekin | F16L 15/06 |
| | | | 285/334 |
| 2018/0258709 A1* | 9/2018 | Yoneyama | F16L 15/04 |
| 2019/0211631 A1* | 7/2019 | Yamaguchi | F16L 15/001 |
| 2020/0248509 A1 | 8/2020 | Sugino et al. | |

* cited by examiner

THREADED CONNECTION FOR STEEL PIPE

This is a National Phase Application filed under 35 U.S.C. § 371, of International Application No. PCT/JP2019/030799, filed Aug. 6, 2019, the contents of which are incorporated by reference.

BACKGROUND

Technical Field

The present disclosure relates to a threaded connection for steel pipe and, more particularly, to a threaded connection for connecting two steel pipes.

Description of the Background Art

Steel pipes called oil-well pipes are used, for example, for prospecting or producing oil or natural gas in oil wells or natural-gas wells (hereinafter collectively referred to as "oil wells" or the like), developing non-conventional resources such as oil sand or shale gas, retrieving or storing carbon dioxide (Carbon dioxide Capture and Storage (CCS)), geothermal power generation, or in hot springs. A threaded connection is used to connect steel pipes.

Such threaded connections for steel pipes are generally categorized as coupling type and integral type. A coupling-type connection connects a pair of pipes, one of which is a steel pipe and the other one is a coupling. In this case, a male thread is provided on the outer periphery of each of the ends of the steel pipe, while a female thread is provided on the inner periphery of each of the ends of the coupling. Then, a male thread of the steel pipe is screwed into a female thread of the coupling such that they are made up and connected. An integral-type connection connects a pair of pipes that are both steel pipes, and does not use a separate coupling. In this case, a male thread is provided on the outer periphery of one end of each steel pipe, while a female thread is provided on the inner periphery of the other end. Then, the male thread of one steel pipe is screwed into the female thread of the other steel pipe such that they are made up and connected.

A connection portion of a pipe end on which a male thread is provided includes an element to be inserted into a female thread, and thus is usually referred to as "pin". A connection portion of a pipe end on which a female thread is provided includes an element for receiving a male thread, and thus is referred to as "box". A pin and a box constitute ends of pipes and are thus tubular in shape.

An oil well is drilled along while its side wall is reinforced by oil-well pipes to prevent the side wall from collapsing during digging, which results in multiple oil-well pipes arranged in one another. In recent years, both land and offshore wells have become deeper and deeper; in such environments, to connect oil-well pipes, threaded connections in which the inner and outer diameters of the connection portions are generally equal to the inner and outer diameters of the steel pipes are often used in order to improve efficiency in developing oil wells. The use of such threaded connections minimizes the clearances between the multiple oil-well pipes arranged in one another, which improves efficiency in developing a deep oil well without significantly increasing the diameter of the well. A threaded connection is required to have good sealability against pressure fluid from the inside (hereinafter also referred to as "internal pressure") and pressure fluid from the outside (hereinafter also referred to as "external pressure") under the above-described restrictions on the inner and outer diameters. Generally, the sealability against the internal pressure is called "internal-pressure sealability", while the sealability against the external pressure is called "external-pressure sealability".

Known threaded connections that ensure sealability include those having a seal that uses metal-to-metal contact (hereinafter referred to as "metal seal"). A metal seal is an arrangement in which the diameter of a pin sealing surface is slightly larger than the diameter of a box sealing surface (the difference between these diameters will be referred to as "amount of seal interference") and, when the threaded connection is made up and the sealing surfaces are fitted onto each other, the amount of seal interference causes the diameter of the pin sealing surface to decrease and the diameter of the box sealing surface to increase and each of the sealing surfaces tries to recover their original diameters and thus produces elastic recovery forces, which produce contact pressures on the sealing surfaces to achieve tight contact along the entire circumference, thereby providing sealability.

JP 2012-247028 A (Patent Document 1) discloses a threaded connection for steel pipe that can ensure stable sealability by resolving deviation of axis and wall-thickness in the pin (see paragraph [0010]). In this threaded connection, the outer periphery of the nose of the pin has a curved shape protruding outwardly. The inner periphery of the nose of the box is tapered in shape. The pin is created by machining its radially inner and outer periphery. The axial length of the machined region of the inner periphery, i.e. length of the inner machined range, is not smaller than the axial length starting from the nose tip of the pin to the seal point, which is that position on the outer periphery of the nose of the pin which first contacts the inner periphery of the nose of the box during thread make-up. For the pin portions within the inner machined range, the ratio of deviation of wall-thickness (=(maximum wall thickness along circumference−minimum wall thickness along circumference)/average wall thickness along circumference*100 (%)) in a given cross section is not higher than 6%. Further, the length of the inner machined range is not larger than the axial length starting from the tip of the pin nose to the rear end of the seal, which forms the end of the seal adjacent to the threaded portion (see paragraph [0011] and FIG. 1).

The following prior art documents are incorporated herein by reference.

[Patent Document 1] JP 2012-247028 A
[Patent Document 2] WO2019/082612A1
[Patent Document 3] JP Hei5(1993)-87275 A (U.S. Pat. No. 5,137,310)
[Patent Document 4] JP 2006-526747 A

SUMMARY

An object of the present disclosure is to provide a threaded connection for steel pipe with good internal-pressure sealability and external-pressure sealability while preventing galling during make-up.

A threaded connection according to the present disclosure is a threaded connection for connecting two steel pipes, including: a tubular pin formed by a tip portion of one of the steel pipes; and a tubular box, the pin being inserted into the box such that the box and the pin are made up. The pin includes: a pin lip formed by a tip portion of the pin; a male thread provided on an outer periphery of the pin and located farther from a tip of the pin than the pin lip is; a pin metal seal provided on an outer periphery of the pin lip; a cylindrical inner machined surface provided on an inner periphery of the pin lip and located within a predetermined range from the tip of the pin, the cylindrical inner machined surface being parallel to an axis of the steel pipes in longitudinal cross-sectional view and having a diameter larger than an inner diameter of the one steel pipe; and a release surface provided on the inner periphery of the pin lip and located between the cylindrical inner machined surface and an inner peripheral surface of the one steel pipe, the release surface being connected to the cylindrical inner machined surface and the inner peripheral surface of the one steel pipe. The pin metal seal includes: a tapered pin seal taper surface having a diameter gradually decreasing toward the tip of the pin; and a pin seal curvature surface smoothly connected to the pin seal taper surface and being outwardly convex in longitudinal cross-sectional view. The box includes: a female thread corresponding to the male thread and provided on an inner periphery of the box; and a box metal seal facing the pin metal seal and provided on the inner periphery of the box. The box metal seal includes a tapered box seal taper surface facing the pin seal taper surface and provided on the inner periphery of the box, the box seal taper surface being parallel to the pin seal taper surface and having a diameter smaller than the pin seal taper surface by a predetermined amount of seal interference before make-up, wherein the pin metal seal sealingly contacts the box metal seal at a border between the pin seal taper surface and the pin seal curvature surface when the connection is made up. The threaded connection satisfies the following expressions, (1) and (2), $$L>Lm>Ls \quad (1), \text{ and}$$

$$tb/tp>1.6 \quad (2).$$

In expression (1), L is the length of the pin lip as measured in the axial direction of the steel pipe; Lm is the distance between the tip of the pin and the end point of the cylindrical inner machined surface as measured in the axial direction of the steel pipe; and Ls is the distance between the tip of the pin and the border as measured in the axial direction of the steel pipe. In expression (2), tb is the wall thickness of the box as measured at the position at which the box contacts the border upon completion of make-up; and tp is the wall thickness of the pin as measured at the border.

Another threaded connection according to the present disclosure is a threaded connection for connecting two steel pipes, including: a tubular pin formed by a tip portion of one of the steel pipes; and a tubular box, the pin being inserted into the box such that the box and the pin are made up. The pin includes: a pin lip formed by a tip portion of the pin; a male thread provided on an outer periphery of the pin and located farther from a tip of the pin than the pin lip is; a pin metal seal provided on an outer periphery of the pin lip; a cylindrical inner machined surface provided on an inner periphery of the pin lip and located within a predetermined range from the tip of the pin, the cylindrical inner machined surface being parallel to an axis of the steel pipes in longitudinal cross-sectional view and having a diameter larger than an inner diameter of the one steel pipe; and a release surface provided on the inner periphery of the pin lip and located between the cylindrical inner machined surface and an inner peripheral surface of the one steel pipe, the release surface being connected to the cylindrical inner machined surface and the inner peripheral surface of the one steel pipe. The pin metal seal includes a tapered pin seal taper surface having a diameter gradually decreasing toward the tip of the pin. The box includes: a female thread corresponding to the male thread and provided on an inner periphery of the box; and a box metal seal facing the pin metal seal and provided on the inner periphery of the box. The box metal seal includes: a tapered box seal taper surface facing the pin seal taper surface and provided on the inner periphery of the box, the box seal taper surface being parallel to the pin seal taper surface and having a diameter smaller than the pin seal taper surface by a predetermined amount of seal interference before make-up; and a box seal curvature surface smoothly connected to the box seal taper surface and being inwardly convex in longitudinal cross-sectional view. The pin metal seal sealingly contacts the box metal seal at a border between the box seal taper surface and the box seal curvature surface when the connection is made up. The threaded connection satisfies the following expressions, (1) and (2), $$L>Lm>Ls \quad (1), \text{ and}$$

$$tb/tp>1.6 \quad (2).$$

In expression (1), L is the length of the pin lip as measured in the axial direction of the steel pipe; Lm is the distance between the tip of the pin and the end point of the cylindrical inner machined surface as measured in the axial direction of the steel pipe; and Ls is the distance between the tip of the pin and the position at which the pin contacts the border upon completion of make-up as measured in the axial direction of the steel pipe. In expression (2), tb is the wall thickness of the box as measured at the border; and tp is the wall thickness of the pin as measured at the position at which the pin contacts the border upon completion of make-up.

DETAILED DESCRIPTION OF THE PREFERRED EMBODIMENTS

[Galling Prevention]

An amount of seal interference (i.e. fit margin) is provided for the metal seal of the threaded connection; during make-up, the sealing surfaces of the pin and box slide past each other while in contact with high contact forces; after completion of make-up, they keep their high contact forces to exhibit sealability. Galling resistance depends on various factors including lubrication, surface treatment, slide rate, the thermal conductivity of the matrix, etc.; particularly, galling resistance largely depends on the local contact pressure during contact sliding, i.e. the peak contact pressure of the sealing surfaces.

Manufacturers of special threaded connections have attempted to reduce the local contact pressure during make-up by devising various designs. For example, the amount of seal interference may be reduced, or the distance of contact sliding may be reduced by increasing the inclination of the sealing surfaces (or taper angle if there are taper surfaces).

If the first approach is taken and the amount of seal interference is reduced excessively, the contact forces after make-up are insufficient, potentially reducing sealability. If the latter approach is taken, the sealability under combined loads, e.g., the seal contact forces upon receiving a high compression load and then receiving a high tensile load, decreases by a large amount, potentially reducing substantially.

That is, it occurred to the inventors that both good galling resistance and good sealability may be achieved if the local contact pressure (i.e. peak contact pressure) of the sealing surfaces is low under contact sliding during make-up and is high after sliding has terminated at completion of make-up.

The inventors attempted to find a seal construction that realizes the above technical idea. They found that, if the sealing surfaces of both the pin and box are taper surfaces with the same inclination and an end of the shorter one of the taper surfaces of the pin and box has a curvature surface smoothly connected to this taper surface, then, large widths of the taper surfaces can contact-slide during a major part of the make-up process, thereby reducing the local contact pressure (i.e. peak contact pressure) to prevent galling, and, after completion of make-up, the pin lip "bowingly deforms" due to the seal interference such that the main contact position of the seal moves to the border between a taper surface of the seal and the curvature surface at its end, thereby reducing the contact width to increase peak contact pressure, thus providing good sealability. This border, which represents the main contact position of the seal after completion of make-up (i.e. border between the taper surface of the seal and the curvature surface at its end) will be hereinafter referred to as seal point (SP).

More exactly, if the taper surface of the pin metal seal is shorter than the taper surface of the box metal seal, an end of the taper surface of the pin metal seal (located farther from the tip of the pin) is provided with a curvature surface smoothly connected to the taper surface. On the contrary, if the taper surface of the box metal seal is shorter than the taper surface of the pin metal seal, an end of the taper surface of the box metal seal (located closer to the opening of the box) is provided with a curvature surface smoothly connected to the taper surface.

The above-mentioned "bowing deformation" of the pin lip means that the pin lip, when forced by the seal interference to reduce its diameter, deforms to bend radially inwardly as if it were bowing as viewed in a longitudinal cross section of the pin containing the pipe axis.

Due to this bowing deformation of the pin, even if the angle of the taper surface of the pin metal seal is equal to the angle of the taper surface of the box metal seal before make-up, it gradually becomes larger during make-up, especially in the latter half of the process, and is larger than the angle of the taper surface of the box metal seal at the time of completion of make-up, such that contact mainly occurs at the border between the taper surface of the metal surface and the curvature surface at its end (i.e. seal point).

[External-Pressure Sealability]

When an external-pressure load is applied to a threaded connection including a single metal seal located farther toward the tip of the pin than the male thread (i.e. farther toward the interior of the box than the female thread), the external-pressure load either penetrates into the interior of the connection through gaps between the threads or acts on lubricant filling the gaps between the threads; in either case, the effects of the external-pressure load reach a position just before the seal point inside the connection.

For above-mentioned external-pressure load, most test standards for threaded connections such as ISO 13679 and API 5C5 specifies magnitudes that do not cause collapse deformation of the body of the steel pipe. However, since a pin provided with a male thread or metal seal usually has a smaller wall thickness than the body of the steel pipe, the external-pressure load penetrating into the interior of the connection causes the entire pin to significantly reduce its diameter (compared with the body of the steel pipe); in worst-case scenarios, the metal seal opens up and causes a leak. That is, the larger the wall thickness of the pin, the better to maintain sealability against high external-pressure loads.

On the other hand, to achieve a uniform seal contact of the metal seal along its entire circumference without an interruption, the wall thickness of a metal seal, especially that of the pin, needs to be uniform along the entire circumference (the box, especially the box of a coupling-type connection, is usually machined internally and externally and thus has little variance in its wall thickness along the circumference). Thus, if a threaded connection is to be provided on a steel pipe having an inner periphery with large deviation of axis and wall-thickness, particularly a similar steel pipe, the inner periphery of the tip of the pin is machined to make the wall thickness of the metal seal uniform.

However, it occurred to the inventors that there should be an appropriate length for the machining of the inner periphery of the tip of the pin because, if the inner periphery of the tip of the pin is machined more than necessary, this impairs the external-pressure sealability.

[Internal-Pressure Sealability]

When an internal-pressure load is applied, the internal pressure applied to those inner-periphery portions between a metal seal, especially that of the pin, and the male thread works to increase the diameter of these pin portions, thereby pressing the pin sealing surface onto the box sealing surface more strongly to amplify the seal contact forces, thus improving sealability.

On the other hand, the internal pressure applied to the inner-surface portions located farther toward the interior of the box than the metal seal (in a coupling-type connection, the inner-periphery portions sandwiched between the metal seals at both ends of the connection) works to increase the diameter of these box portions, and acts in a way to try to separate the box sealing surface from the pin sealing surface and to reduce the seal contact forces, thus reducing sealability.

That is, whether the sealability under an internal-pressure load is good or poor depends on which of the press effect of the pin seal due to the internal-pressure load and the action of the box seal to try to separate is larger. The inventors assumed that the magnitude of this effect or action depends on the resistance of the pin/box portions of the near the pin seal and box seal against deformation (i.e. their stiffness), that is, the ratio between the wall thicknesses, and found that there is a suitable wall-thickness ratio between the pin seal and box seal to maintain and improve the internal-pressure sealability.

[Summary of Embodiments]

To let the technical ideas described above materialize, the present inventors found that it is the machined length of the inner peripheral surface of the pin lip which controls the bow deformation of the pin lip caused by the amount of seal interference and the deformation of the pin lip with reduced diameter caused by the external-pressure load, and did extensive research to find the suitable range using the elastic-plastic finite element method. They found out that the end point of the cylindrical inner machined surface of the pin lip is suitably located between the sealing point of the pin seal and the start point of the male thread.

In other words, this suitable range is L>Lm>Ls, where L is the length of the pin lip as measured in the pipe-axis direction, Ls is the distance between the sealing point of the pin sealing surface and the pin tip, and Lm is the distance between the pin tip and the end point of the cylindrical inner machined surface.

The inventors did further research into the ratio of the wall thickness tb of the box as measured at the sealing point relative to the wall thickness tp of the pin as measured at the sealing point, which significantly contributes to the improvement of the internal-pressure sealability, using an elastic-plastic finite element analysis. The found out that tb/tp>1.6 provides good internal-pressure sealability.

If the distance between the pin tip and the end point of the cylindrical inner machined surface is adjusted to the above range, the pin sealing surface is in contact with and slides on the box sealing surface along a large width for most of the time during make-up, thereby minimizing the local contact pressure to improve galling resistance, whereas the pin lip bowingly deforms to a sufficient degree upon completion of make-up such that the main contact position (i.e. sealing point) moves to the border between the pin sealing surface and the curvature surface located at the end of the pin sealing surface, thereby reducing the contact width and increasing the local contact pressure to improve sealability. The external pressure that has penetrated through the gap between the threads up to a position directly before the sealing point tries to reduce the diameter of the entire pin; however, the portions of the pin that have smaller wall thicknesses resulting from inner machining are located closer to the tip than the thread is; thus, even if these portions are forced by the external pressure to reduce its diameter, the stiffness of the adjacent thread helps minimize the displacement with reduced diameter, thereby reducing the decrease in the external-pressure sealability. Since the box seal has a significantly larger wall thickness than the pin seal, the effect of the internal pressure acting on the inner surface between the pin metal seal and male thread, of pressing the pin sealing surface on the box sealing surface, overwhelms the effect of the internal pressure of increasing the diameter of the box sealing surface, thereby improving internal-pressure sealability, too.

Based on the above-described findings, the present inventors invented the threaded connections described below.

A threaded connection according to an embodiment is a threaded connection for connecting two steel pipes, including: a tubular pin formed by a tip portion of one of the steel pipes; and a tubular box, the pin being inserted into the box such that the box and the pin are made up. The pin includes: a pin lip formed by a tip portion of the pin; a male thread provided on an outer periphery of the pin and located farther from a tip of the pin than the pin lip is; a pin metal seal provided on an outer periphery of the pin lip; a cylindrical inner machined surface provided on an inner periphery of the pin lip and located within a predetermined range from the tip of the pin, the cylindrical inner machined surface being parallel to an axis of the steel pipes in longitudinal cross-sectional view and having a diameter larger than an inner diameter of the one steel pipe; and a release surface provided on the inner periphery of the pin lip and located between the cylindrical inner machined surface and an inner peripheral surface of the one steel pipe, the release surface being connected to the cylindrical inner machined surface and the inner peripheral surface of the one steel pipe. The pin metal seal includes: a tapered pin seal taper surface having a diameter gradually decreasing toward the tip of the pin; and a pin seal curvature surface smoothly connected to the pin seal taper surface and being outwardly convex in longitudinal cross-sectional view. The box includes: a female thread corresponding to the male thread and provided on an inner periphery of the box; and a box metal seal facing the pin metal seal and provided on the inner periphery of the box. The box metal seal includes a tapered box seal taper surface facing the pin seal taper surface and provided on the inner periphery of the box, the box seal taper surface being parallel to the pin seal taper surface and having a diameter smaller than the pin seal taper surface by a predetermined amount of seal interference before make-up. The pin metal seal sealingly contacts the box metal seal at a border between the pin seal taper surface and the pin seal curvature surface upon completion of make-up. The threaded connection satisfies the following expressions, (1) and (2), $$L > Lm > Ls \qquad (1), \text{ and}$$

$$tb/tp > 1.6 \qquad (2).$$

In expression (1), L is the length of the pin lip as measured in the axial direction of the steel pipe; Lm is the distance between the tip of the pin and the end point of the cylindrical inner machined surface as measured in the axial direction of the steel pipe; and Ls is the distance between the tip of the pin and the border as measured in the axial direction of the steel pipe. In expression (2), tb is the wall thickness of the box as measured at the position at which the box contacts the border upon completion of make-up; and tp is the wall thickness of the pin as measured at the border.

A threaded connection according to another embodiment is a threaded connection for connecting two steel pipes, including: a tubular pin formed by a tip portion of one of the steel pipes; and a tubular box, the pin being inserted into the box such that the box and the pin are made up. The pin includes: a pin lip formed by a tip portion of the pin; a male thread provided on an outer periphery of the pin and located farther from a tip of the pin than the pin lip is; a pin metal seal provided on an outer periphery of the pin lip; a cylindrical inner machined surface provided on an inner periphery of the pin lip and located within a predetermined range from the tip of the pin, the cylindrical inner machined surface being parallel to an axis of the steel pipes in longitudinal cross-sectional view and having a diameter larger than an inner diameter of the one steel pipe; and a release surface provided on the inner periphery of the pin lip and located between the cylindrical inner machined surface and an inner peripheral surface of the one steel pipe, the release surface being connected to the cylindrical inner machined surface and the inner peripheral surface of the one steel pipe. The pin metal seal includes a tapered pin seal taper surface having a diameter gradually decreasing toward the tip of the pin. The box includes: a female thread corresponding to the male thread and provided on an inner periphery of the box; and a box metal seal facing the pin metal seal and provided on the inner periphery of the box. The box metal seal includes: a tapered box seal taper surface facing the pin seal taper surface and provided on the inner periphery of the box, the box seal taper surface being parallel to the pin seal taper surface and having a diameter smaller than the pin seal taper surface by a predetermined amount of seal interference before make-up; and a box seal curvature surface smoothly connected to the box seal taper surface and being inwardly convex in longitudinal cross-sectional view. The pin metal seal sealingly contacts the box metal seal at a border between the box seal taper surface and the box seal curvature surface when the connection is made up. The threaded connection satisfies the following expressions, (1) and (2), $$L > Lm > Ls \quad (1), \text{ and}$$

$$tb/tp > 1.6 \quad (2).$$

In expression (1), L is the length of the pin lip as measured in the axial direction of the steel pipe; Lm is the distance between the tip of the pin and the end point of the cylindrical inner machined surface as measured in the axial direction of the steel pipe; and Ls is the distance between the tip of the pin and the position at which the pin contacts the border upon completion of make-up as measured in the axial direction of the steel pipe. In expression (2), tb is the wall thickness of the box as measured at the border; and tp is the wall thickness of the pin as measured at the position at which the pin contacts the border upon completion of make-up.

Preferably, the threaded connection satisfies the following expression, (3), $$Lm > Lp \quad (3).$$

In expression (3), Lp is the distance between the tip of the pin and the end of the pin metal seal closer to the male thread as measured in the axial direction of the steel pipe.

The pin may further include a pin shoulder formed by a tip surface of the pin lip. The box may further include a box shoulder facing the pin shoulder and contacting the pin shoulder during make-up.

The pin seal taper surface and the box seal taper surface may each have a taper angle of 1 to 22 degrees before make-up.

The pin seal curvature surface or the box seal curvature surface may each have a radius of curvature not greater than 80 mm before make-up.

The release surface may be tapered in shape.

The release surface may have a taper angle of 5 to 30 degrees before make-up.

Embodiments of the threaded connection for steel pipe will now be described with reference to the drawings. The same and corresponding components are labeled with the same characters in the drawings, and the same description will not be repeated.

First Embodiment

Figure 1:
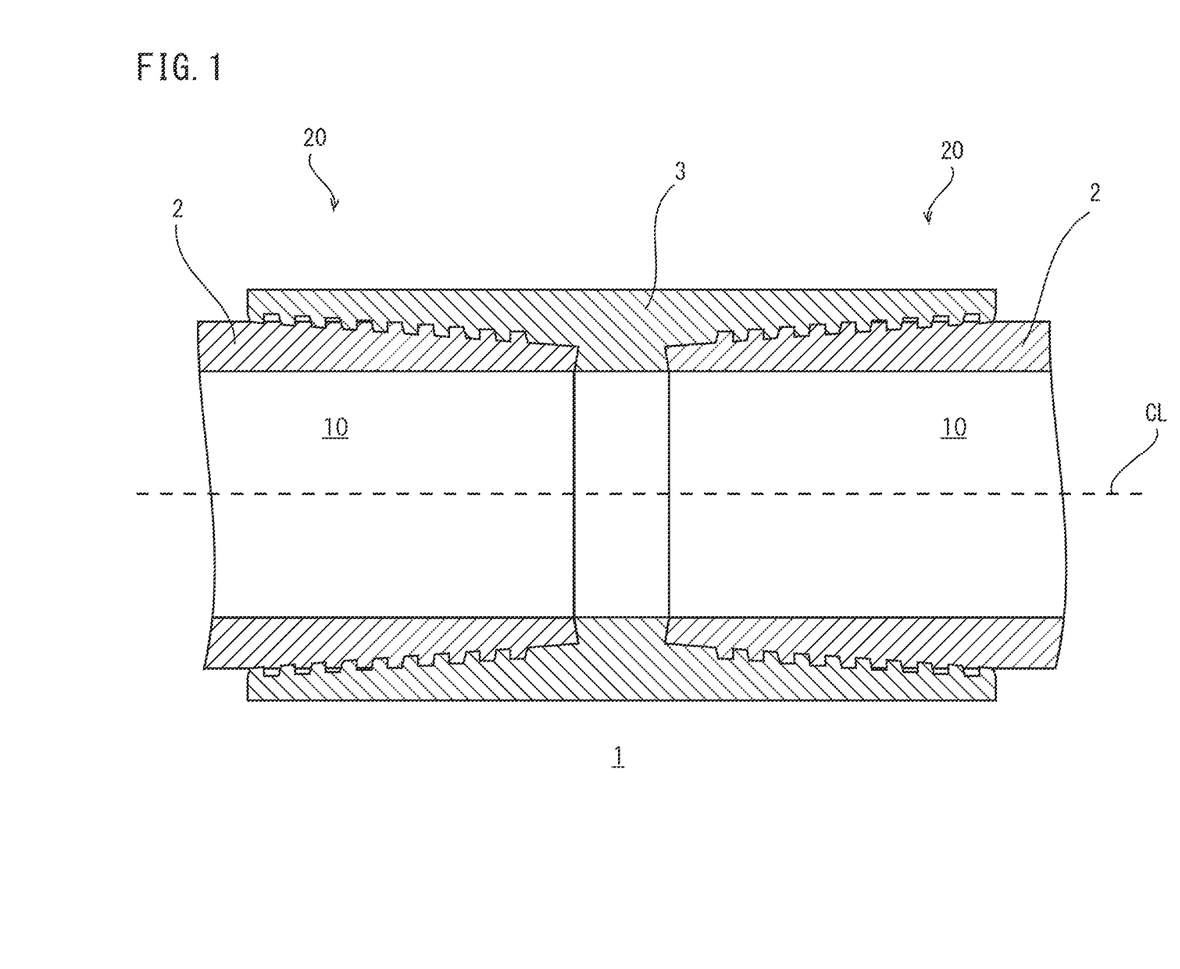
FIG. 1 is a schematic longitudinal cross-sectional view, taken along the pipe axis, of a coupling-type threaded connection according to a first embodiment.

FIG. 1 is a schematic longitudinal cross-sectional view of a threaded connection 1 for steel pipe according to a first embodiment. As shown in FIG. 1, the threaded connection 1 is used to connect two steel pipes 2. The threaded connection 1 includes a tubular pin 10 and a tubular box 20. The pin 10 is formed by a tip portion of each steel pipe 2. The pin 10 is inserted into the box 20 such that the box 20 and pin 10 are made up.

The threaded connection 1 shown in FIG. 1 is a coupling-type connection that includes a coupling 3. The coupling 3 connects the two steel pipes 2. The coupling 3 includes two boxes 20.

Figure 2:
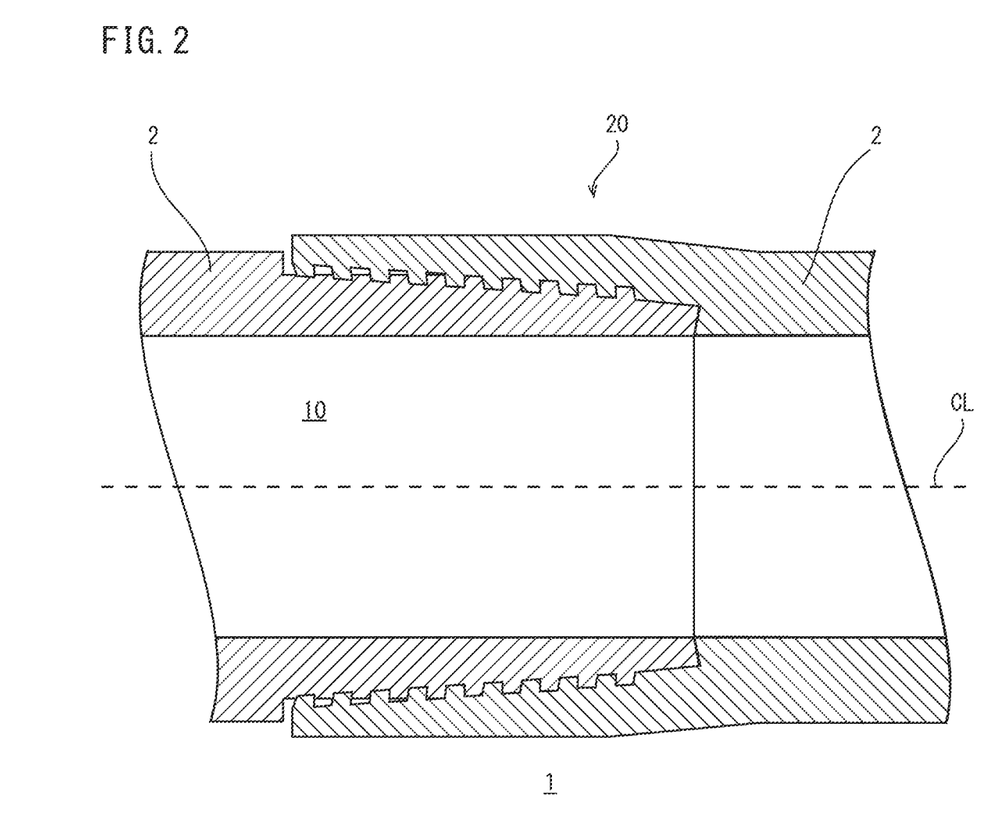
FIG. 2 is a schematic longitudinal cross-sectional view, taken along the pipe axis, of an integral-type threaded connection different from the threaded connection of FIG. 1.

Alternatively, the threaded connection 1 may be an integral-type connection. As shown in FIG. 2, the integral-type threaded connection 1 is also used to connect two steel pipes 2 and includes a pin 10 and a box 20. In the integral-type threaded connection 1, one steel pipe includes the pin 10, while the other steel pipe includes the box 20.

In FIGS. 1 and 2, CL indicates the axial direction with respect to the steel pipe 2 (hereinafter simply referred to as "pipe-axis direction").

Figure 3:
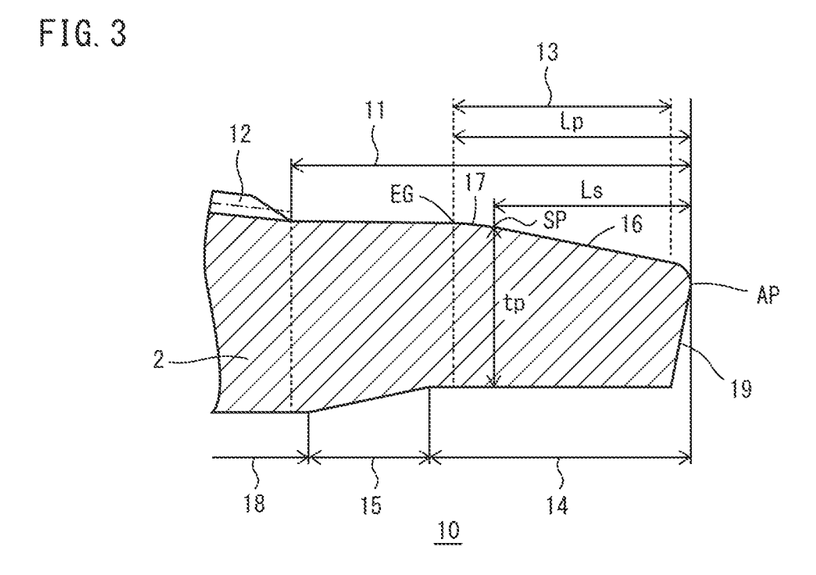
FIG. 3 is a longitudinal cross-sectional view, taken along the pipe axis, of the pin of the threaded connection shown in FIG. 1 or 2.

As shown in FIG. 3, the pin 10 includes a pin lip 11, a male thread 12, a pin metal seal 13, a cylindrical inner machined surface 14, and a release surface 15. The pin lip 11 is formed by a tip portion of the pin 10. The male thread 12 is provided on the outer periphery of the pin 10 and located farther from the tip AP of the pin 10 than the pin lip 11 is. The pin male seal 13 is provided on the outer periphery of the pin lip 11. The cylindrical inner machined surface 14 is provided on the inner periphery of the pin lip 11 and located within a predetermined range Lm from the tip of the pin 10, and is formed to be parallel to the axis of the steel pipe 2 (hereinafter simply referred to as "pipe axis") in longitudinal cross-sectional view and has a diameter larger than the inner diameter of the steel pipe 2. The release surface 15 is provided on the inner periphery of the pin lip 11 and located between the cylindrical inner machined surface 14 and the inner peripheral surface 18 of the steel pipe 2, and is connected to the cylindrical inner machined surface 14 and the inner peripheral surface 18 of the steel pipe 2.

The pin metal seal 13 includes a pin seal taper surface 16 and a pin seal curvature surface 17. The pin seal taper surface 16 has a diameter that gradually decreases as it goes toward the tip AP of the pin 10, and is tapered in shape. The pin seal curvature surface 17 is smoothly connected to the pin seal taper surface 16 and is outwardly convex in longitudinal cross-sectional view. More specifically, the pin seal curvature surface 17 may be connected to the pin seal taper surface 16 such that they are arranged in the direction of their tangents. More specifically, the pin seal curvature surface 17 and pin seal taper surface 16 may be connected such that the normal of the pin seal curvature surface 17 the normal of the pin seal taper surface 16 as determined at the connecting point are aligned.

Figure 4:
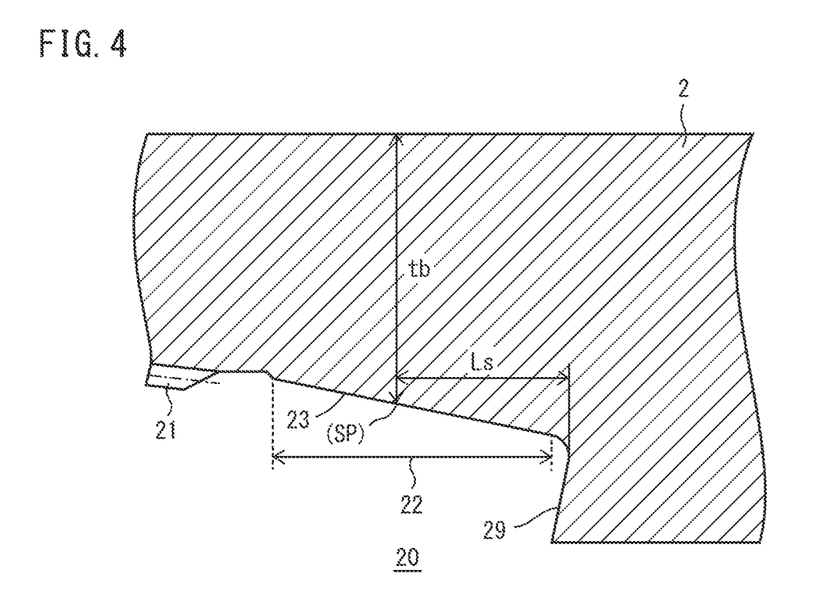
FIG. 4 is a longitudinal cross-sectional view, taken along the pipe axis, of the box of the threaded connection shown in FIG. 1 or 2.

As shown in FIG. 4, the box 20 includes a female thread 21 and a box metal seal 22. The female thread 21 corresponds to the male thread 12 and is provided on the inner periphery of the box 20. The box metal seal 22 faces the pin metal seal 13 and is provided on the inner periphery of the box 20.

Figure 5:
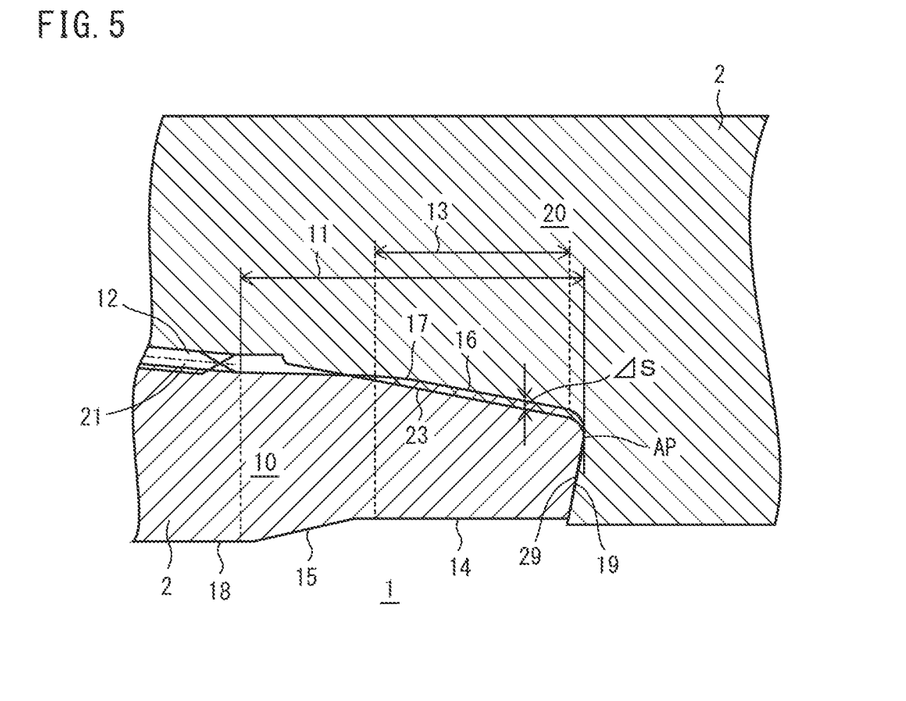
FIG. 5 is a longitudinal cross-sectional view, taken along the pipe axis, illustrating the shapes of the pin and box shown in FIGS. 3 and 4 found when they are made up and before deformation.

The box metal seal 22 includes a box seal taper surface 23. The box seal taper surface 23 faces the pin seal taper surface 16 and is provided on the inner periphery of the box 20. As shown in FIG. 5, the box seal taper surface 23 is parallel to the pin seal taper surface 16 and has a diameter smaller than the pin seal taper surface 16 by a predetermined amount of interference ($2 \times \Delta S$) before make-up.

Figure 6:
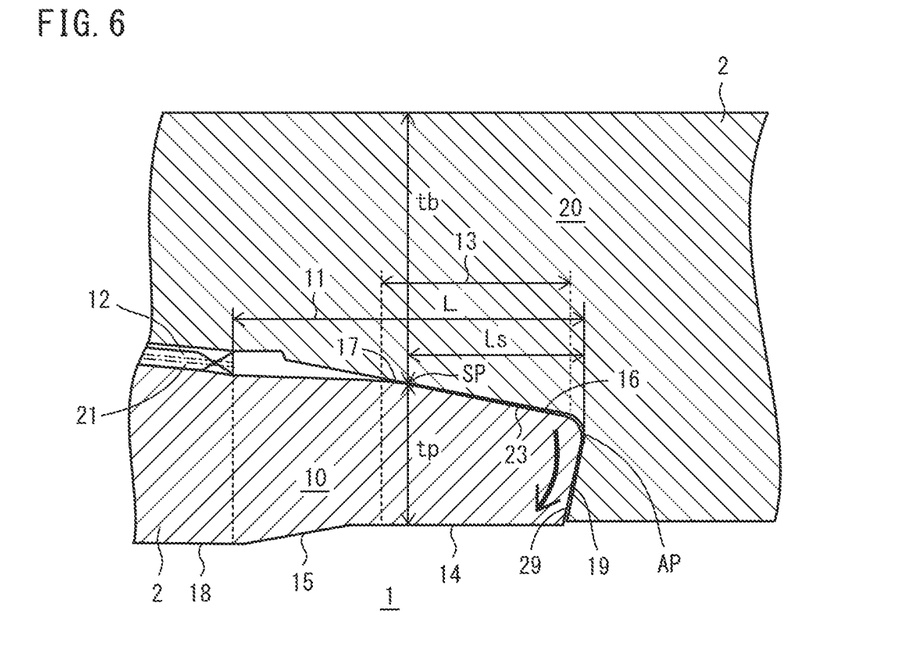
FIG. 6 is a longitudinal cross-sectional view, taken along the pipe axis, illustrating the shapes of the pin and box shown in FIGS. 3 and 4 found when they are made up and after deformation.
Figure 7:
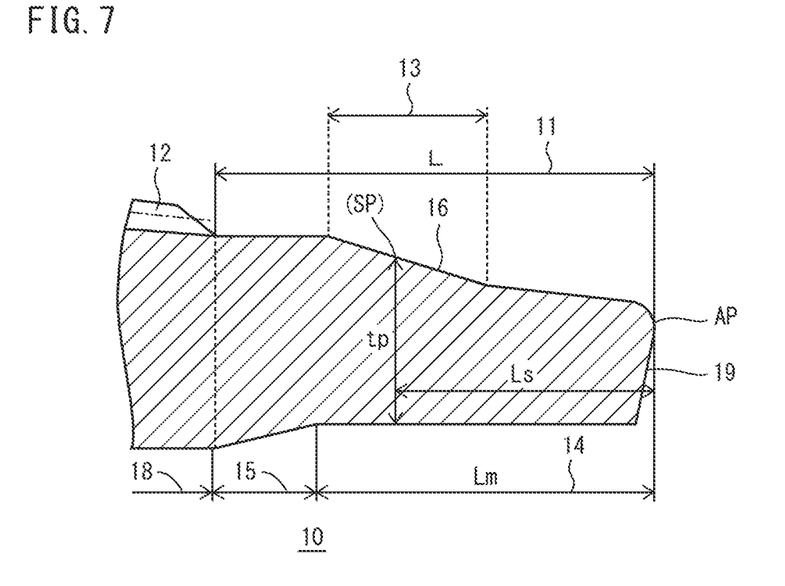
FIG. 7 is a longitudinal cross-sectional view, taken along the pipe axis, of a pin of a threaded connection according to a second embodiment.
Figure 8:
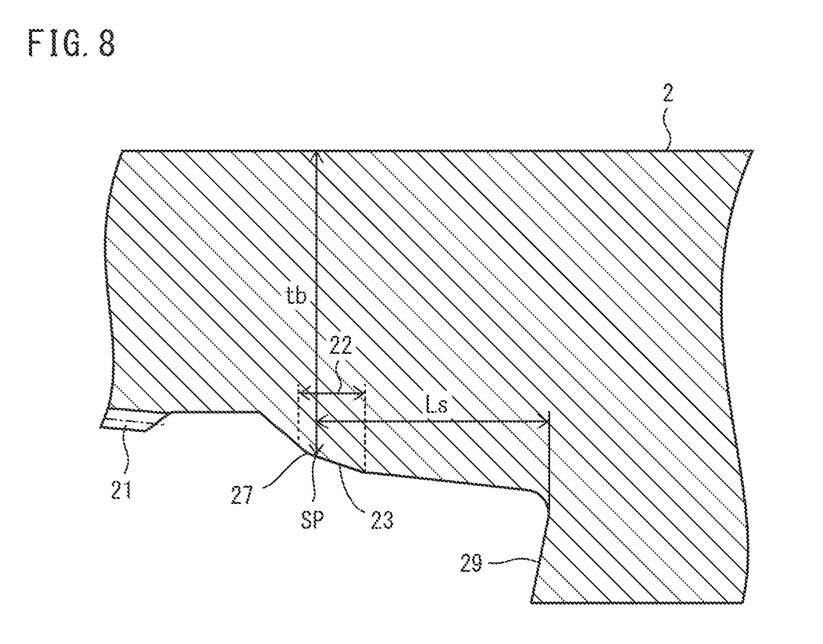
FIG. 8 is a longitudinal cross-sectional view, taken along the pipe axis, of a box of the threaded connection according to the second embodiment shown in FIG. 7.
Figure 9:
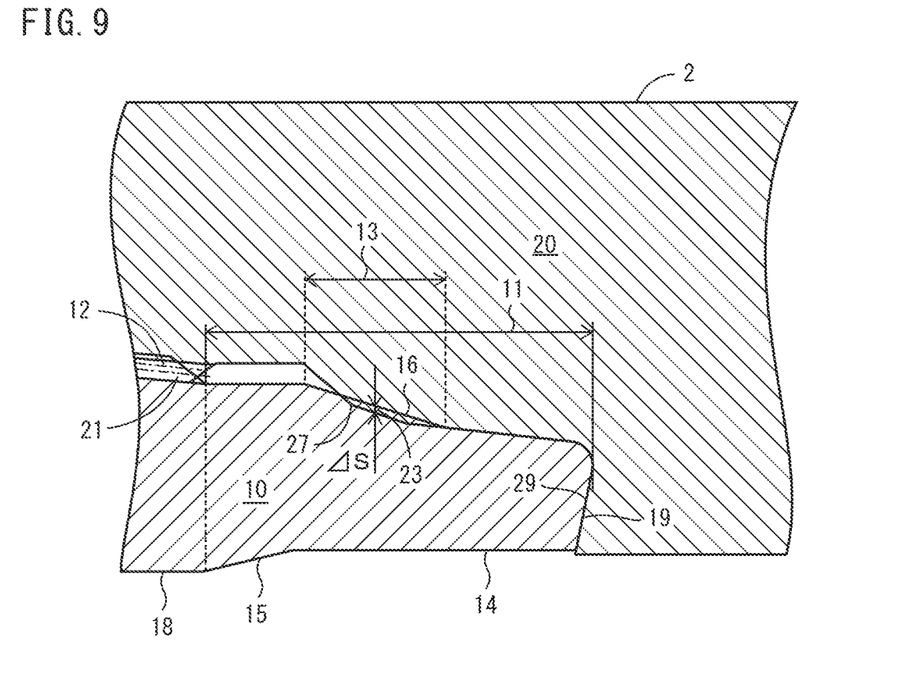
FIG. 9 is a longitudinal cross-sectional view, taken along the pipe axis, illustrating the shapes of the pin and box shown in FIGS. 7 and 8 found when they are made up and before deformation.
Figure 10:
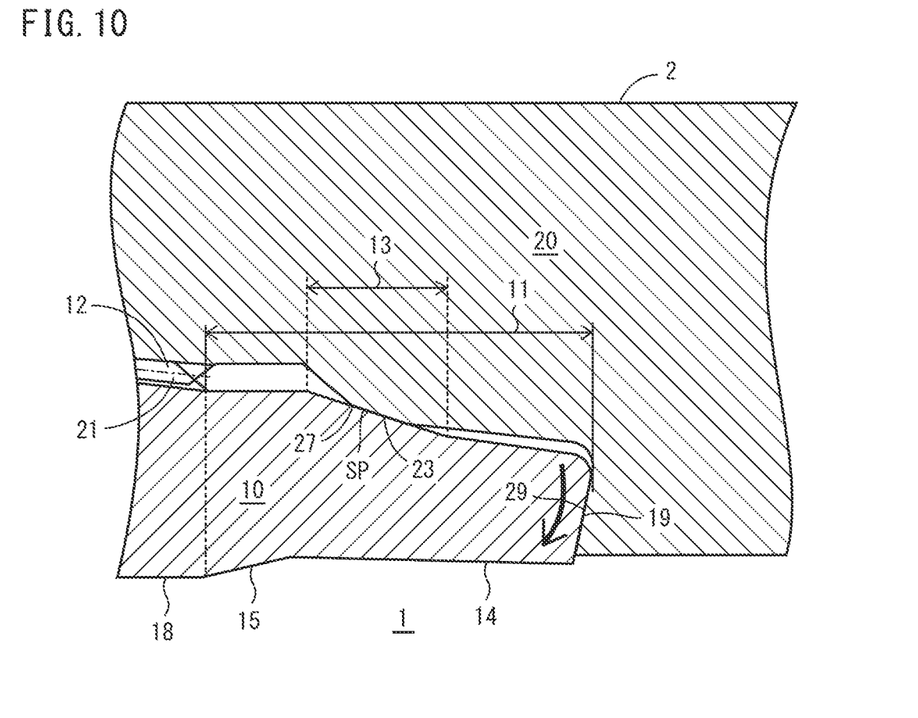
FIG. 10 is a longitudinal cross-sectional view, taken along the pipe axis, illustrating the shapes of the pin and box shown in FIGS. 7 and 8 found when they are made up and after deformation.

As shown in FIG. 6, the pin metal seal 13 is in sealing contact with the box metal seal 23 at the border SP between the pin seal taper surface 16 and pin seal curvature surface 16 during make-up.

The threaded connection 1 satisfies the following expressions, (1) and (2):

$$L > Lm > Ls \quad (1), \text{ and}$$

$$tb/tp > 1.6 \quad (2).$$

In expression (1), L is the length of the pin lip 11 as measured in the pipe-axis direction CL. Lm is the distance between the tip AP of the pin 10 and the end point of the cylindrical inner machined surface 14 as measured in the pipe-axis direction CL. Ls is the distance between the tip AP of the pin 10 and the border SP as measured in the pipe-axis direction CL.

In expression (2), tb is the wall thickness of the box 20 as measured at the position at which the box contacts the border SP upon completion of make-up. tp is the wall thickness of the pin 10 as measured at the border SP.

Preferably, the threaded connection 1 satisfies the following expression, (3):

$$Lm > Lp \quad (3).$$

In expression (3), Lp is the distance between the tip AP of the pin 10 and the end EG of the pin metal seal 13 closer to the male thread 12 as measured in the pipe-axis direction CL.

According to the present embodiment, the pin 10 further includes a pin shoulder 19. The pin shoulder 19 is formed by the tip surface of the pin lip 11. The box 20 further includes a box shoulder 29. The box shoulder 29 faces the pin shoulder 19 and is in contact with the pin shoulder 19 during make-up. The pin and box seal taper surfaces 16 and 23 have taper angles in the range of 1 to 22 degrees before make-up. The pin seal curvature surface 17 has a radius of curvature not greater than 80 mm before make-up. The release surface 15 is a tapered in shape. The release surface 15 has a taper angle in the range of 5 to 30 degrees before make-up.

Reasoning Behind Lm>Ls:

The metal seal of a threaded connection for steel pipe exhibits its sealability as the pin metal seal whose diameter has been reduced by the amount of seal interference and the box metal seal whose diameter has been increased come into tight contact along the entire circumference due to the elastic recovery force created as they try to return to their original diameters. The magnitude of this elastic recovery force is closely related to the stiffnesses of the seals of the pin and box, where the larger the wall thickness (i.e. the less easily they can be deformed), the larger the elastic recovery force becomes and the smaller the wall thickness (i.e. the more easily they can be deformed), the smaller the elastic recovery force becomes. If there are variations in the wall thickness of the metal seals along the circumferential direction, the seal contact force also varies along the circumferential direction, resulting in portions with strong contact and portions with weak contact such that a leak can easily occur in the portions with weak contact, leading to an unstable sealability. To cause the seals to tightly contact each other uniformly along the entire circumference, the wall thickness of the pin seal contact and the portions of the pin located closer to its tip than the pin seal contact is must be uniform along the entire circumference (the pin seal is chosen here as it has a smaller wall thickness than the box seal).

Lm>Ls is in order that the wall thickness of the pin seal and the portions of the pin located closer to its tip than the pin seal is uniform along the entire circumference, thereby stabilizing sealability. If Lm<Ls, especially in a seamless steel pipe, the effects of variations in the wall thickness along the circumferential direction would reach the pin seal, preventing a tight contact between the seals that is uniform along the entire circumference, resulting in an unstable sealability.

Second Embodiment

A threaded connection 1 according to a second embodiment, shown in FIGS. 7 to 10, is different from the threaded connection 1 according to the first embodiment shown in FIGS. 3 to 6 in the following points. That is, according to the first embodiment, the pin seal taper surface 16 is shorter than the box seal taper surface 23; according to the second embodiment, the box seal taper surface 23 is shorter than the pin seal taper surface 16. Further, according to the first embodiment, the pin metal seal 13 is smoothly connected to the pin seal taper surface 16 and includes a pin seal curvature surface 17 that is outwardly convex in longitudinal cross-sectional view; according to the second embodiment, the box metal seal 22 is smoothly connected to the box seal taper surface 23 and includes a box seal curvature surface 27 that is inwardly convex in longitudinal cross-sectional view.

Similar to the threaded connection 1 according to the first embodiment, the threaded connection 1 according to the second embodiment satisfies the following expressions, (1) and (2):

$$L > Lm > Ls \quad (1), \text{ and}$$

$$tb/tp > 1.6 \quad (2).$$

In expression (1), L is the length of the pin lip 11 as measured in the pipe-axis direction. Lm is the distance between the tip AP of the pin 10 and the end point of the cylindrical inner machined surface 14 as measured in the pipe-axis direction CL. Ls is the distance between the tip AP of the pin 10 and the position (SP) at which the pin contacts the border SP upon completion of make-up as measured in the pipe-axis direction CL.

In expression (2), tb is the wall thickness of the box 20 as measured at the border SP. tp is the wall thickness of the pin 10 as measured at the position at which the pin contacts the border SP upon completion of make-up.

While embodiments have been described, the present invention is not limited to the above-described embodiments, and various modifications are possible without departing from the spirit of the invention.

EXAMPLES

To verify the effects of the above-described embodiments, a numerical simulation analysis was conducted using the elastic-plastic finite element method.

<Test Conditions>

The elastic-plastic finite element analysis used the coupling-type threaded connection shown in FIG. 1. The common test conditions were as follows:

Dimensions of steel pipe: 9-5/8 inches, 53.5# (with an outer diameter of 244.48 mm and a wall thickness of 13.84 mm)

Material grade: L80 steel according to the API (American Petroleum Institute) standards (with a yield strength of 552 N/mm2, an elastic modulus of 210 kN/mm2, and a Poisson's ratio of 0.3)

Shapes and dimensions of threads: API buttress-type trapezoidal threads (with a load-flank angle of −3 degrees, a stab-flank angle of 10 degrees, a male-thread height of 1.978 mm, a thread pitch of 6.35 mm (4TPI) and a thread taper of 1/16)

Length (L) of pin lip: 15 mm

Taper angle of pin and box seal taper surfaces: 15 degrees

Radius of curvature of pin and box seal curvature surfaces: 5 mm

Taper angle of release surface: 15 degrees

Under the common test conditions listed above, 17 threaded connections (models) were created, as listed below in Table 1.

was the integral quantity of contact pressure that was generated during a make-up process (starting with shouldering and ending with 1/100 turns), Pintegral (contact pressure×slide distance), as measured at a specified position on the outer peripheral surface of the pin lip. The integral quantity of contact pressure Pintegral is an indicator of the quantity of frictional heat generated at a specified position on the outer peripheral surface of the pin lip; the smaller this value, the lower the galling risk becomes.

Table 1 shows the maximum values of Pintegral for the models. In the models except model 2, i.e. models 1 and 3 to 17, the seal taper mismatch was 0 degrees, i.e. the pin seal taper surface and box seal taper surface were parallel. It was found that models 1 and 3 to 17 had lower values of Pintegral than model 2 and had lower galling risks than model 2.

Figure 11:
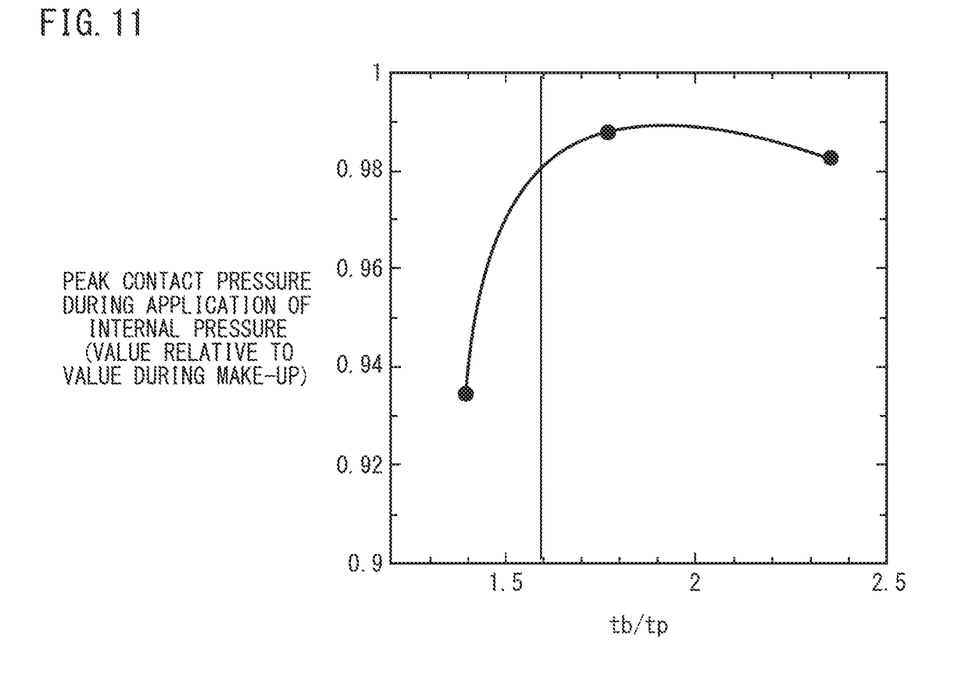
FIG. 11 is a graph illustrating the relationship between the box wall thickness/pin wall thickness and the peak contact pressure during loading of the internal pressure/peak contact pressure during make-up.

Analysis (2) evaluated the inner-pressure sealability. As illustrated by FIG. 11, a comparison of the values of the peak contact pressure during loading of the internal pressure for models 1, 13 and 17, which were only different in the outer diameter of the coupling, reveals that models 1 and 13 had larger peak contact pressures and therefore better internal-pressure sealabilitys than model 17.

TABLE 1

| | Length of parallel inner machined surface Lm mm | Sealing point Ls mm | Coupling outer diameter mm | tb/tp | Seal taper mismatch degree | Maximum of Pintegral N/mm | Bow angle of pin lip (during make-up) degree | Ratio of peak contact pressure (during application of internal pressure/during make-up) | Ratio of peak contact pressure (during application of external pressure/during make-up) |
|---|---|---|---|---|---|---|---|---|---|
| 1 | 8.0 | 5 | 267 | 2.36 | 0 | 520.2 | 0.48 | 0.98 | 0.58 |
| 2 | 8.0 | 5 | 267 | 2.36 | 1 | 754.9 | 0.44 | 0.95 | 0.68 |
| 3 | 2.5 | 5 | 267 | 2.15 | 0 | 515.2 | 0.42 | 0.99 | 0.60 |
| 4 | 11.0 | 8 | 267 | 2.31 | 0 | 517.0 | 0.44 | 0.95 | 0.56 |
| 5 | 2.5 | 8 | 267 | 1.90 | 0 | 513.9 | 0.38 | 0.95 | 0.59 |
| 6 | 50.0 | 8 | 267 | 2.31 | 0 | 497.5 | 0.47 | 0.97 | 0.13 |
| 7 | 15.0 | 8 | 267 | 2.31 | 0 | 520.9 | 0.47 | 0.94 | 0.54 |
| 8 | 30.0 | 8 | 267 | 2.31 | 0 | 502.9 | 0.48 | 0.96 | 0.37 |
| 9 | 15.0 | 5 | 267 | 2.36 | 0 | 516.7 | 0.53 | 0.99 | 0.53 |
| 10 | 30.0 | 5 | 267 | 2.36 | 0 | 497.5 | 0.53 | 1.00 | 0.45 |
| 11 | 50.0 | 5 | 267 | 2.36 | 0 | 495.9 | 0.52 | 1.00 | 0.20 |
| 12 | 2.5 | 5 | 259 | 1.61 | 0 | 516.1 | 0.42 | 0.97 | 0.61 |
| 13 | 8.0 | 5 | 259 | 1.77 | 0 | 521.5 | 0.48 | 0.99 | 0.59 |
| 14 | 15.0 | 5 | 259 | 1.77 | 0 | 520.7 | 0.53 | 1.01 | 0.54 |
| 15 | 30.0 | 5 | 259 | 1.77 | 0 | 501.1 | 0.53 | 0.99 | 0.44 |
| 16 | 50.0 | 5 | 259 | 1.77 | 0 | 496.3 | 0.52 | 0.98 | 0.19 |
| 17 | 8.0 | 5 | 254 | 1.40 | 0 | 523.8 | 0.48 | 0.93 | 0.58 |

Analysis (1): Analysis of simulation of make-up of threaded connection

When the pin and box were made up, rotation occurred until shouldering and then further rotation occurred by 1/100 turns.

Analysis (2): Evaluation and analysis of internal-pressure sealability

A simple internal pressure with 100% of the yield strength of the steel pipe was applied to the entire surface starting at the inner surface of the connection (i.e. inner surface of the steel pipe) and ending at the metal seal.

Analysis (3): Evaluation and analysis of external-pressure sealability

A simple external pressure with 100% of the collapse pressure according to the API5C3 standard was applied to the entire surface starting at the outer surface of the connection (i.e. outer surface of the steel pipe) and ending at the metal seal.

Figure 12:
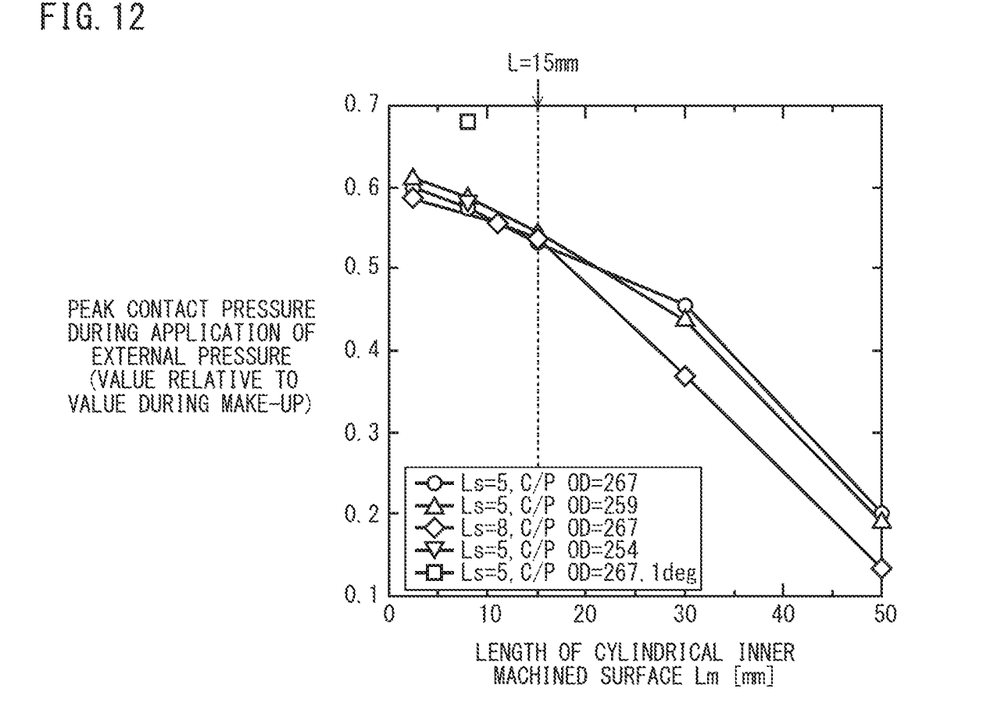
FIG. 12 is a graph illustrating the relationship between the length of the cylindrical inner machined surface and the peak contact pressure during loading of the internal pressure/peak contact pressure during make-up.

Analysis (1) evaluated how easily galling occurred during make-up. The indicator used of how easily galling occurred Analysis (3) evaluated the external-pressure sealability. As illustrated by FIG. 12, for the models with the same position Ls of the sealing point and the same outer diameter of the coupling (C/P OD), the values of the peak contact pressure during loading of the external pressure were plotted, which reveals that models 6, 8, 10, 11, 15 and 16, in which the length Lm of the cylindrical inner machined surface was larger than the length L of the pin lip (=15 mm), had lower external-pressure sealabilitys.

Figure 13:
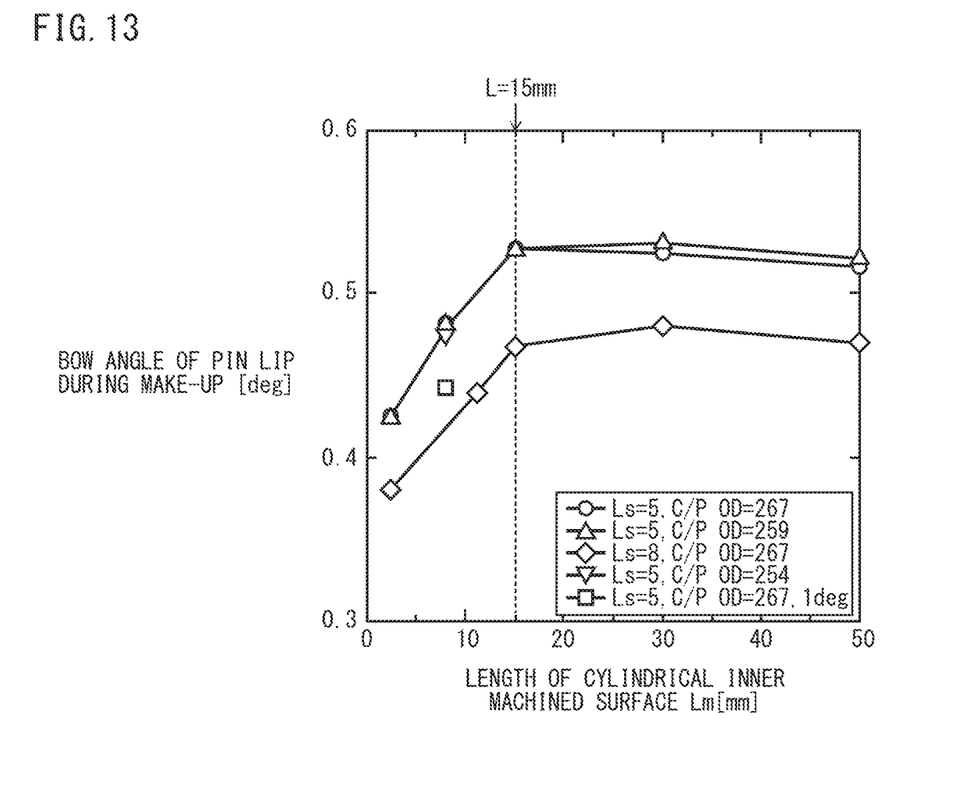
FIG. 13 is a graph illustrating the relationship between the length of the cylindrical inner machined surface and the bow angle of the pin lip during make-up.

A consideration of the results of both analyses (1) and (3) reveals that each of models 1, 4, 7, 9, 13 and 14 provided a sufficient bow angle produced by the amount of seal interference, as shown in FIG. 13, and had a high peak contact pressure during loading of external pressure, and thus had both good galling resistance and external-pressure sealability. Further, the results of analysis (2) reveals that internal-pressure sealability is also good if tb/tp>1.6.

These results show that models 1, 4, 7, 9, 13 and 14 had better galling resistances and better internal-pressure and external-pressure sealabilities than the other models.

EXPLANATION OF CHARACTERS

1: threaded connection
2: steel pipe
10: pin
11: pin lip
12: male thread
13: pin metal seal
14: cylindrical inner machined surface
15: release surface
16: pin seal taper surface
17: pin seal curvature surface
18: inner peripheral surface of steel pipe
19: pin shoulder
20: box
21: female thread
22: box metal seal
23: box seal taper surface
27: box seal curvature surface
29: box shoulder
ΔS: amount of seal interference
SP: border (sealing point)
L: length of pin lip
Lm: distance between the tip of the pin and the end point of the cylindrical inner machined surface
Ls: distance between the tip of the pin and sealing point
tb: wall thickness of the box as measured at the sealing point
tp: wall thickness of the pin as measured at the sealing point

What is claimed is:

1. A threaded connection for connecting two steel pipes, comprising:
    a tubular pin formed by a tip portion of one of the steel pipes; and
    a tubular box, the pin being inserted into the box such that the box and the pin are made up,
    the pin including:
    a pin lip formed by a tip portion of the pin;
    a male thread provided on an outer periphery of the pin and located farther from a tip of the pin than the pin lip is;
    a pin metal seal provided on an outer periphery of the pin lip;
    a cylindrical inner machined surface provided on an inner periphery of the pin lip and located within a predetermined range from the tip of the pin, the cylindrical inner machined surface being parallel to an axis of the steel pipes in longitudinal cross-sectional view and having a diameter larger than an inner diameter of the one steel pipe; and
    a release surface provided on the inner periphery of the pin lip and located between the cylindrical inner machined surface and an inner peripheral surface of the one steel pipe, the release surface being connected to the cylindrical inner machined surface and the inner peripheral surface of the one steel pipe,
    the pin metal seal including:
    a tapered pin seal taper surface having a diameter gradually decreasing toward the tip of the pin; and
    a pin seal curvature surface smoothly connected to the pin seal taper surface and being outwardly convex in longitudinal cross-sectional view,
    the box including:
    a female thread corresponding to the male thread and provided on an inner periphery of the box; and
    a box metal seal facing the pin metal seal and provided on the inner periphery of the box,
    the box metal seal including a tapered box seal taper surface facing the pin seal taper surface and provided on the inner periphery of the box, the box seal taper surface being parallel to the pin seal taper surface and having a diameter smaller than the pin seal taper surface by a predetermined amount of seal interference before make-up,
    wherein the pin metal seal sealingly contacts the box metal seal at a border between the pin seal taper surface and the pin seal curvature surface upon completion of make-up, and
    the threaded connection satisfies the following expressions, (1) and (2), $$L > Lm > Ls \qquad (1), \text{ and}$$

$$tb/tp > 1.6 \qquad (2),$$

where, in expression (1), L is the length of the pin lip as measured in the axial direction of the steel pipe,
    Lm is the distance between the tip of the pin and the end point of the cylindrical inner machined surface as measured in the axial direction of the steel pipe,
    Ls is the distance between the tip of the pin and the border as measured in the axial direction of the steel pipe,
    in expression (2), tb is the wall thickness of the box as measured at the position at which the box contacts the border upon completion of make-up, and
    tp is the wall thickness of the pin as measured at the border.

2. The threaded connection according to claim 1, wherein the threaded connection satisfies the following expression, (3), $$Lm > Lp \qquad (3),$$

where, in expression (3), Lp is the distance between the tip of the pin and the end of the pin metal seal closer to the male thread as measured in the axial direction of the steel pipe.

3. The threaded connection according to claim 1, wherein the pin further includes a pin shoulder formed by a tip surface of the pin lip, and
    the box further includes a box shoulder facing the pin shoulder and contacting the pin shoulder during make-up.

4. The threaded connection according to claim 2, wherein the pin seal taper surface and the box seal taper surface each have a taper angle of 1 to 22 degrees before make-up.

5. The threaded connection according to claim 1, wherein the pin seal curvature surface has a radius of curvature not greater than 80 mm before make-up.

6. The threaded connection according to claim 1, wherein the release surface is tapered in shape.

7. The threaded connection according to claim 6, wherein the release surface has a taper angle of 5 to 30 degrees before make-up.

8. A threaded connection for connecting two steel pipes, comprising:
    a tubular pin formed by a tip portion of one of the steel pipes; and
    a tubular box, the pin being inserted into the box such that the box and the pin are made up, the pin including:

a pin lip formed by a tip portion of the pin;

a male thread provided on an outer periphery of the pin and located farther from a tip of the pin than the pin lip is;

a pin metal seal provided on an outer periphery of the pin lip;

a cylindrical inner machined surface provided on an inner periphery of the pin lip and located within a predetermined range from the tip of the pin, the cylindrical inner machined surface being parallel to an axis of the steel pipes in longitudinal cross-sectional view and having a diameter larger than an inner diameter of the one steel pipe; and a release surface provided on the inner periphery of the pin lip and located between the cylindrical inner machined surface and an inner peripheral surface of the one steel pipe, the release surface being connected to the cylindrical inner machined surface and the inner peripheral surface of the one steel pipe, the pin metal seal including a tapered pin seal taper surface having a diameter gradually decreasing toward the tip of the pin, the box including:

a female thread corresponding to the male thread and provided on an inner periphery of the box; and a box metal seal facing the pin metal seal and provided on the inner periphery of the box, the box metal seal including:

a tapered box seal taper surface facing the pin seal taper surface and provided on the inner periphery of the box, the box seal taper surface being parallel to the pin seal taper surface and having a diameter smaller than the pin seal taper surface by a predetermined amount of seal interference before make-up; and a box seal curvature surface smoothly connected to the box seal taper surface and being inwardly convex in longitudinal cross-sectional view, wherein the pin metal seal sealingly contacts the box metal seal at a border between the box seal taper surface and the box seal curvature surface upon completion of make-up, and the threaded connection satisfies the following expressions, (1) and (2), $$L > Lm > Ls \tag{1}$$

and $$tb/tp > 1.6 \tag{2}$$

where, in expression (1), L is the length of the pin lip as measured in the axial direction of the steel pipe, Lm is the distance between the tip of the pin and the end point of the cylindrical inner machined surface as measured in the axial direction of the steel pipe, Ls is the distance between the tip of the pin and the position at which the pin contacts the border upon completion of make-up as measured in the axial direction of the steel pipe, in expression (2), tb is the wall thickness of the box as measured at the border, and tp is the wall thickness of the pin as measured at the position at which the pin contacts the border upon completion of make-up.

9. The threaded connection according to claim 8, wherein the threaded connection satisfies the following expression, (3), $$Lm > Lp \tag{3}$$

where, in expression (3), Lp is the distance between the tip of the pin and the end of the pin metal seal closer to the male thread as measured in the axial direction of the steel pipe.

10. The threaded connection according to claim 8, wherein the pin further includes a pin shoulder formed by a tip surface of the pin lip, and the box further includes a box shoulder facing the pin shoulder and contacting the pin shoulder during make-up.

11. The threaded connection according to claim 8, wherein the pin seal taper surface and the box seal taper surface each have a taper angle of 1 to 22 degrees before make-up.

12. The threaded connection according to claim 8, wherein the box seal curvature surface has a radius of curvature not greater than 80 mm before make-up.

13. The threaded connection according to claim 8, wherein the release surface is tapered in shape.

14. The threaded connection according to claim 13, wherein the release surface has a taper angle of 5 to 30 degrees before make-up.

* * * * *